United States Patent [19]

Gamblin

[11] Patent Number: 4,698,642

[45] Date of Patent: Oct. 6, 1987

[54] NON-ARTIFICALLY PERTURBED (NAP) LIQUID JET PRINTING

[75] Inventor: Rodger L. Gamblin, Dayton, Ohio

[73] Assignee: Burlington Industries, Inc., Greensboro, N.C.

[21] Appl. No.: 742,861

[22] Filed: Jun. 10, 1985

Related U.S. Application Data

[63] Continuation-in-part of Ser. No. 428,490, Sep. 28, 1982, Pat. No. 4,523,202, which is a continuation-in-part of Ser. No. 231,326, Feb. 4, 1981, abandoned.

[51] Int. Cl.[4] .......... G01D 15/18

[52] U.S. Cl. .......... 346/75; 68/205 R

[58] Field of Search .......... 346/75, 1.1; 239/4, 239/102.2; 68/205 R

[56] References Cited

U.S. PATENT DOCUMENTS

| | | | |
|---|---|---|---|
| 2,753,453 | 7/1956 | Michels | 331/78 X |
| 2,773,185 | 12/1956 | Fulton | 331/78 |
| 3,298,030 | 1/1967 | Lewis | 346/75 |
| 3,373,437 | 3/1968 | Sweet et al. | 346/75 |
| 3,416,153 | 12/1968 | Hertz et al. | 346/75 |
| 3,484,793 | 12/1969 | Weigl | 346/75 |
| 3,560,988 | 2/1971 | Kirck | 346/75 X |
| 3,579,721 | 5/1971 | Kaltenbach | 425/3 |
| 3,586,907 | 6/1971 | Beam | 346/75 X |
| 3,596,275 | 7/1971 | Sweet | 346/75 X |
| 3,656,171 | 4/1972 | Robertson | 346/75 X |
| 3,673,601 | 6/1972 | Hertz | 346/75 |
| 3,675,148 | 7/1972 | Edwards | 331/78 |
| 3,798,656 | 3/1974 | Lowy et al. | 346/75 X |
| 3,882,508 | 5/1975 | Stoneburner | 346/75 |
| 3,891,121 | 6/1975 | Stoneburner | 346/75 X |
| 3,898,671 | 8/1975 | Berry et al. | 346/75 |
| 3,916,421 | 10/1975 | Hertz | 346/75 |
| 3,956,756 | 5/1976 | Paton | 346/75 |
| 4,005,435 | 1/1977 | Lindquist et al. | 346/75 X |
| 4,018,383 | 4/1977 | Paton | 346/75 X |
| 4,074,277 | 2/1978 | Lane | 346/75 |
| 4,095,232 | 6/1978 | Cha | 346/75 |
| 4,223,320 | 9/1980 | Paranupe | 346/75 |
| 4,324,117 | 4/1982 | Schwob | 68/205 R |
| 4,523,202 | 6/1985 | Gamblin | 346/75 |
| 4,528,070 | 7/1985 | Gamblin | 204/11 |
| 4,550,323 | 10/1985 | Gamblin | 346/75 |

FOREIGN PATENT DOCUMENTS

| | | |
|---|---|---|
| 2154472 | 11/1971 | Fed. Rep. of Germany . |
| 1095689 | 12/1967 | United Kingdom . |
| 1417597 | 12/1975 | United Kingdom . |

OTHER PUBLICATIONS

"Spray Printing for Fabrics", by Dr. J. Eibl Leverkusen, Chemiefasern/Textil—Industrie, Jul. 1977, pp.

(List continued on next page.)

*Primary Examiner*—Joseph W. Hartary
*Attorney, Agent, or Firm*—Nixon & Vanderhye

[57] ABSTRACT

A non-artificially perturbed (NAP) fluid jet marking/-treating apparatus and process wherein the treating fluid (10) is in the form of ink, dyestuff or other printing, marking or coloring medium, is delivered under pressure to a cross-machine array of jet orifices (14) from which the medium issues continuously as streams (16) that break randomly into discrete droplets in flight. The moving random droplets are selectively charged as they are formed in a selectively energizable electrostatic field (18). The paths of charged droplets are controlled by a downstream electrostatic deflection field (20) through which the droplets pass. Depending on whether the droplets are charged, they are either caught by a collector (22), or continue falling to impinge on a receiving substrate such as a textile, paper or any other desired medium, product or substance.

The streams (16) break up naturally and randomly into droplets. Since the apparatus is not provided with a separate stimulator, vibrator or perturbation device, the orifice plate can have virtually an unlimited cross-machine length. By controlling certain equipment parameters, such random droplet breakup can occur with a narrow distribution around a mean drop size to produce results very much the same as with coherently perturbed systems.

20 Claims, 11 Drawing Figures

OTHER PUBLICATIONS 636-645, English Translation, pp. E113-E115.

"Ink—Jet Printing", by Larry Kuhn et al., Scientific American, Apr. 1979, pp. 162-178.

"Ink—Jet Printing—A New Possibility in Textile Printing", by Rudolf Meyer et al, Melliand Texiberichte [English Edition], Feb.-Mar. 1977, pp. 162-165, 255-261.

"Ink Jet Printing", by Fred J. Kamphoefner, IEEE Transactions on Electron Devices, vol. ED-19, No. 4, Apr. 1972, pp. 584-593.

"DIJIT Ink Jet Printing", by Peter L. Duffield, TAGA Proceedings for 1974, pp. 116-132.

"Jet Set: by Mike Keeling Appearing in British Journal Identifies as Erit PRTR, vol. 93, No. 6, for Jun. 1980, apparently at pp. 21 et seq.

NON-ARTIFICALLY PERTURBED (NAP) LIQUID JET PRINTING

This application is a continuation-in-part of my earlier copending application Ser. No. 428,490 filed Sept. 28, 1982, now U.S. Pat. No. 4,523,202, which is, in turn, a continuation-in-part of my still earlier copending application Ser. No. 231,326 filed Feb. 4, 1981, now abandoned. It is also related to the following commonly assigned copending applications (hereby incorporated by reference):

Ser. No. 501,785 filed June 7, 1983, now U.S. Pat. No. 4,550,323 (Rodger L. Gamblin; "ELONGATED FLUID JET PRINTING APPARATUS")

Ser. No. 464,101 filed Feb. 4, 1983, now U.S. Pat. No. 4,528,070 (Rodger L. Gamblin; "IMPROVED ORIFICE PLATE CONSTRUCTION")

This invention relates generally to the field of electrostatically controlled fluid marking/treatment sometimes commonly referred to as "ink jet" printing—although liquids of various types other than "ink" may be utilized.

Devices of this general type typically include a pressurized source of marking/treatment fluid feeding a cross-machine array of orifices. A fluid jet streaming through each orifice breaks into a sequence of individual droplets falling under gravity forces toward a substrate (which is typically moving thereunder in a longitudinal direction transverse to the orifice array). Electric charge is selectively imparted or not imparted to the droplets as they form. Charged droplets are thereafter electrostatically deflected toward a catcher apparatus (e.g., for recirculation and reuse) while uncharged droplets continue on their downward journey to strike the substrate. In this sense the system effects selective "binary" printing operations of a desired treating or marking fluid onto the substrate surface.

Liquid jet printing apparatuses and methods of various types are generally well known in the prior art. A non-exhaustive collection of such prior art has already been cited in my earlier referenced and related copending applications:

U.S. Pat. No. 3,298,030—Lewis (1967)
U.S. Pat. No. 3,373,437—Sweet et al (1968)
U.S. Pat. No. 3,416,153—Hertz (1968)
U S. Pat. No. 3,484,793—Weigl (1969)
U.S. Pat. No. 3,560,988—Krick (1971)
U.S. Pat. No. 3,579,721—Kaltenbach (1971)
U.S. Pat. No. 3,586,907—Beam (1971)
U.S. Pat. No. 3,596,275—Sweet (1971)
U.S. Pat. No. 3,656,171—Robertson (1972)
U.S. Pat. No. 3,673,601—Hertz (1972)
U.S. Pat. No. 3,798,656—Lowy et al (1974)
U.S. Pat. No. 3,882,508—Stoneburner (1975)
U.S. Pat. No. 3,891,121—Stoneburner (1975)
U.S. Pat. No. 3,898,671—Berry et al (1975)
U.S. Pat. No. 3,916,421—Hertz (1975)
U.S. Pat. No. 3,956,756—Paton (1976)
U.S. Pat. No. 4,005,435—Lindquist (1978)
U.S. Pat. No. 4,074,277—Lane (1978)
U.S. Pat. No. 4,223,320—Paranjpe (1980)
U.K. Pat. No. 1,095,689—Paillard
German patent No. 2,154,472—Casio (a) "Spray Printing Process for Fabrics" by Dr. J. Eibl Leverkusen, Chemiefasern/TextilIndustrie, July 1977, pp. 636–645, English Translation, pp. E113–E115.

(b) "Ink-Jet Printing" by Larry Kuhn et al, Scientific American, April 1979, pp. 162–178.

(c) "Ink Jet Printing—A New Possibility In Textile Printing", by Rudolf Meyer et al, Melliand Textilberichte [English Edition], February–March 1977, pp. 162–165, 255–261.

(d) "Ink Jet Printing" by Fred J. Kamphoefner, IEEE Transactions on Electron Devices, Vol. ED-19, No. 4, April 1972, pp. 584–593.

(e) "DIJIT Ink Jet Printing" by Peter L. Duffield, TAGA Proceedings for 1974, pp. 116–132.

(f) "Jet Set" by Mike Keeling appearing in British Journal identified as ERIT PRTR, Volume 93, No. 6 for June 1980 apparently at page 21 et seq.

In many of these devices, jets (very narrow streams) are created by forcing a supply of recording fluid or ink from a manifold through a series of fine orifices or nozzles. The chamber which contains the ink (or the orifices by which the jets are formed) typically is regularly and periodically vibrated or "stimulated" at a single "coherent" frequency so that the jets are caused to break up into droplets of uniform size and regular spacing. Each such stream of drops is formed in proximity to an associated selective charging electrode which establishes electrical charges (by induction phenomena) on the drops as they are formed. The flight of the drops to a receiving substrate (under gravity forces and against atmospheric drag forces) is controlled by interaction with a fixed electrostatic deflection field through which the drops pass, which selectively (1) permits them to continue falling in a trajectory toward the substrate (if not charged), or (2) deflects them to an ink collection and recirculalion apparatus (sometimes called a "gutter") thus preventing them from contacting the substrate (if charged).

While it has been known that a fine liquid jet will break into discrete droplets under its inherent thermal and acoustic motion even in the absence of any external perturbations, it has heretofore generally been believed that coherent single frequency (i.e., regular periodic) perturbation at or near the natural frequency of drop formation was a *practical* necessity to produce droplets that are sufficiently regularly spaced, sized, and timed across the orifice array to permit proper use of the apparatus. Printing with charged drops requires relatively precise control of the droplet paths to ultimate positions on the receiving substrate, and drop size, spacing, and charge level have generally been regarded as critical factors.

Thus, Sweet requires regular periodic (i.e., coherent single frequency) perturbation means for assuring that droplets in the stream are spaced at regular intervals and are uniform in size. As noted by Sweet, the stream has a natural tendency, due at least in part to the surface tension of the fluid, to break up into a succession of droplets. However, as is easily observed in a jet of water squirted through a garden hose nozzle, the droplets are ordinarily not uniform as to dimension or frequency. In order to assure that the droplets will be substantially uniform in dimension and frequency, Sweet provides means for introducing what he refers to as "regularly spaced varicosities" in the stream. These varicosities create regularly spaced and timed undulations in the cross-sectional dimension of the jet stream issuing from the nozzle at a uniform velocity. They are made to occur at or near the natural frequency of droplet formation.

A wide variety of varicosity inducing means are now known in the art. For example, Krick utilizes a supersonic vibrator in the piping through which ink is fed from the source to the apparatus. In Kaltenbach, the ink is ejected through orifices formed in a perforated plate which is vibrated continuously at a resonant frequency.

Since Sweet's original work, non-contact marking devices utilizing fluid droplet streams have become commercially developed. However, so far as is known to me, it has been a well known and universally accepted characteristic of all commercially successful ink jet devices that each of them utilizes some type of coherent single frequency (i.e., regular periodic) varicosity inducing means or "stimulator" to induce regular periodic vibrations into the stream and thus provide droplet regularity and uniformity.

As noted in Stoneburner '508, providing proper stimulation has been one of the most difficult past problems in the operation of these devices. For high quality commercially successful recording, it has in the past been necessary that all jets be stimulated at the same single frequency and with very nearly the same applied acoustic power to cause break-up of all the streams across the entire orifice array into uniformly sized and regularly spaced drops.

FIG. 1A schematically depicts drop formation processes at a given orifice jet stream for successive times $t_1$–$t_7$. As shown in the uppermost sequence, a desired optimum coherently perturbed drop formation process involves regular periodic formation of equally sized droplets. However, unless carefully controlled (e.g., by optimized coherent perturbation), one may actually observe the next-lower sequence of FIG. 1A where an elongated fluid streamer between adjacent relatively enlarged portions of the jet does *not* break neatly at only one location. Rather, it may break at two or more spaced apart locations thus creating one or more smaller "satellite" drop(s) disposed between larger sized drops. This tendency to form intermediate satellite droplets is especially pronounced for higher viscosity (e.g., higher viscosity than that of water) liquids—such as might sometimes be encountered with liquid dyes or other textile treatment liquids.

These intermediate satellite droplets have long been known as extremely undesirable in liquid jet printing systems. If they have sufficient velocity relative to the larger drops, they may move sufficiently "forward" or "backward" to merge with a larger drop. However, if such merger does not promptly occur, then serious problems may result. For example, because of their much smaller mass, charged satellites will tend to have a much higher charge-to-mass ratio (e/m) than regular drops and thus are forced to follow a much different trajectory in the fixed electrostatic deflection field. Their e/m ratio may even be so large as to cause deflection of satellites directly onto the oppositely charged charge plate itself (i.e., under influence of the charging electric field) before they even reach the downstream deflection field. In any event, and by whatever mechanism, non-merged satellites become uncontrolled liquid masses which, over time, tend to accumulate in unwanted locations. For example, they may tend to electrically short out charging or deflection electrodes or otherwise interfere with desired operations of the liquid jet printing system. On the other hand, even if the satellites become merged with a larger drop, this will then change the e/m ratio for that larger drop and thus may undesirably alter *its* subsequent trajectory.

Thus for many reasons, the prior art has long appreciated the practical necessity of avoiding satellite formation. It is also desired to have the streams break into droplets at a limited predetermined location proximate the charging electrode—else they will not be charged to the proper extent or perhaps not charged at all. Both of these desired results have been thought to require optimized coherent perturbations to occur *all along the array of orifices throughout the entire cross-machine direction* (e.g., transverse to the direction of substrate movement). Among other possible criteria, optimum perturbation is a function of the mechanical (i.e., acoustic or vibrational) power delivered to each fluid stream being perturbed.

If optimum coherent perturbations are to be maintained simultaneously in all the many fluid streams issuing from the elongated array of orifices (e.g., perhaps on the order of 100–200 orifices per inch), some control technique must be employed to continuously ensure substantially equal acoustic power deliveries to each orifice/stream of the array. This is not a trivial task. Stoneburner, for example, shows means for generating a traveling acoustic wave along the length of an ink supply manifold of which an orifice plate forms one side. The wave guide so formed is specially tapered (i.e., progressively decreased in width along its length) to counteract and reduce the natural tendency toward attenuation of the drop stimulating bending waves as they travel down the length of the orifice plate.

Only by such carefully crafted regular periodic (i.e., coherent) stimulation techniques has it been possible to obtain commercially satisfactory results over cross-machine dimensions on the order of those encountered in typical letter/legal size paper printing operations. For example, using 0.00192 inch sized orifices (and 120 orifices per inch perturbed at 48 Kilohertz), the maximum prior art cross-machine width is on the order of only about 10 or 10.5 inches. Using smaller 0.001 inch sized orifices, the maximum prior art cross-machine dimension is on the order of only about 5 inches. At higher frequencies, the possible length of the orifice plate may be reduced while at lower frequencies it may be lengthened because the distance between the nodes and nulls of a standing wave is proportional to the wavelength of the coherent stimulations.

As just mentioned, in practice there is often an undesirable interaction between the stimulator and the structure of the ink delivery system. This adverse effect may show up as a tendency for the overall system to achieve non-uniform stimulation across the orifice array due to reflected and interfering waves (as referred to in Stoneburner, just discussed), such that certain orifices do not receive appropriate stimulation while others have too much. The system thus has "nodes" and/or null points that are reflected as degradations in the quality of droplet deposition at certain points along the orifice array. Furthermore, with these variations in power, satellite or very small droplets tend to form in between each of the larger droplets and cause difficulties within the system in that these fine droplets tend to escape and be dispersed into the surrounding area or beyond the acceptable target area limits. Satellite droplet formation is a sensitive function of the properties of the ink or treating liquid being used so that the problem of stimulation is further complicated.

Such standing waves occur in the presence of coherent (i.e., regular periodic) stimulation, for example, because of the existence of unwanted but unavoidable "sneak paths" for acoustic energy propagation in the structure or by non-matched transitions or non-matched terminations in the impedance of the acoustic energy propagation path(s) or perhaps by other phenomena. In any event, it is a well known characteristic of standing waves that they result in cusps or nodes (i.e., peaks) and nulls (i.e., valleys) of available wave power displaced spatially along the wave propagation path(s) by distances which are proportional to the wavelength of the coherent acoustic vibrations within the liquid and/or structure of the orifice array.

Unless the standing waves can be suppressed, such cusps and nulls will virtually ensure non-optimized drop formation *somewhere* along the cross-machine dimension of the orifice array if it is of sufficient length. Successful suppression of these standing waves becomes more and more difficult as the cross-machine dimension of an orifice array is increased. Optimum coherent stimulation is also closely related to the fluid characteristics (e.g., surface tension and/or viscosity). That is, the frequency of coherent stimulation and the acoustic transmission line structure for transmitting vibrations along the orifice array to each jet stream must be carefully matched to the particular liquid being used. As noted above, commercial success has so far been achieved only for relatively short cross-machine dimensions—and even then only for a relatively few particular types of liquid inks.

While a 10 inch cross-machine width is acceptable for many applications, it is not for many others. For example, if treatment of typical continuous length textile fabrics is contemplated, cross-machine widths on the order of 1.8 meters are typically required. In addition, a variety of textile dyes or other treating fluids having differing characteristics (e.g., liquid with different viscosities and surface tensions and liquid dyes with dispersed particles therein) must be handled if a general application of liquid jet printing technology to the textile industry is to be successful.

As already mentioned, there are numerous disadvantages associated with limitations on the maximum cross-machine dimension of the orifice plate. The primary disadvantage is encountered in trying to build a coherently perturbed orifice system suitable for treatment of continuous length broad width goods, for example including those in the textile field, wallpaper, paper or other continuous length broad width goods or in continuously or intermittently fed forms of other wide substrates or materials. Such goods, substrates or materials typically range in width from about one foot to perhaps several yards. Experience shows that it is extremely difficult and, practically speaking, virtually impossible to combine two or more limited length coherently perturbed orifice plates in series across the needed cross-machine distance in a manner that will permit sufficiently uniform continuous treating of such goods or materials, and more particularly to mask the separation between such different orifice plate sections, and/or to mask the effect of their mutually different operational patterns. It becomes increasingly difficult to obtain a satisfactory result as the number of such short length perturbed orifice plates is increased to span increasing widths of goods to be treated.

Beam (U.S. Pat. No. 3,586,907) at column 3, lines 56–60, states:

"As the coating material passes through the orifices 41, there is a natural tendency for each of the jets to break into a series of fine drops. However, these drops would not be generated naturally at a uniform rate, nor would they normally be of the uniform size. Therefore, to assure uniformity an external stimulation is applied to the coating head. As shown in FIG. I of the drawings, this may take the form of a sonic vibrator 100 attached to the manifold 10, and imposing a sonic signal of a pre-determined frequency of the system."

Thus, Beam considers the application of regular periodic sonic energy to the apparatus depicted in his patent to be of importance. While some might argue with hindsight that Beam suggests use without the vibrator 100 or 101, such argument is not in reality supported by the Beam patent nor its basic intent. It is, of course, possible to design an ink jet system as described in Beam. The stimulated droplets in such configuration break up within the charge plate region, and subsequently can be directed either to be caught or to be delivered to the substrate in a binary fashion. If an attempt were made to operate such a system as depicted by Beam '907 without the benefit of regular periodic stimulation, it would be observed that the misregistration of the printing drops upon the substrate would become large compared to the stimulated system. This factor arises as taught because the droplets in breaking up randomly would break off over a range of distances near the charge plate structure of Beam '907, and would either not be properly charged, or if properly charged, would suffer varying times of reaching the substrate and be misregistered.

To re-capture the registration capability of the Beam system *without* artificial stimulation, as is here proposed, I undertake design changes that include use of smaller orifices, increased pressure, and modified electrical voltages.

Thus, if the Beam '907 apparatus is operated without stimulation, such action would result in a severe degradation of its print quality as pointed out by the above Beam quote. To restore such print quality, Beam would have to undertake the very modifications now being pointed out.

Lowy (U.S. Pat. No. 3,798,656) also notes at column 3, lines 30–45, that droplet streams break up on their own accord into a series of random droplets. Lowy addresses a system of deflected jets used for printing as in a line printer where alternate electrodes are inclined, and oppositely charged so as to create deflection fields that have alternating signs. There is no accumulation of potential across the array of electrodes. More specifically, Lowy uses the deflected drops for printing, and furthermore, catches uncharged droplets by means of the incline of the deflection plates.

There is almost no possibility that a deflected jet system (as in Lowy) could be made operative unless the droplets were stimulated. Individual droplets are deflected according to the ratio of the square of charge to mass. A variation in diameter of the droplets will cause a change in mass as the cube of its diameter and charging in a potential field varies as the radius of the droplet. Therefore, the charge-to-mass ratio of a droplet that breaks off in a fixed electrostatic field potential varies as one over the drop radius squared which would lead to grossly variable random trajectories for droplets of varying size. Thus, the Lowy system cannot be made to operate without stimulation (at least with any kind of reasonable fidelity) due to the large and variable component of deflection that would arise from droplet size variation, as well as variations in the break off point.

In the past, considerations such as these are believed to have led most experts in ink jet printing technology to conclude that this technology was not suitable for general use in the textile industry. That is, for reasons such as those discussed above, many have in the past concluded that, as a practical matter, for textile industry applications it would not be possible to avoid satellite drops where: (a) a relatively long cross-machine length orifice array is employed, and/or (b) quite different types of fluid must be successfully handled. They have apparently concluded that unless one could learn to live with satellite drops, it would be impractical to successfully realize a wide cross-machine jet printer for use in the textile industry.

However, I have noted that such prior reasoning is ultimately based on the conventional supposition that one must, as a practical matter, employ coherent (i.e., regular periodic) stimulations simultaneously all across the orifice array to thus induce regular periodic uniformly sized drop formation processes. Thus, in spite of the long and well known fact that a liquid jet stream will naturally, but randomly, break into droplets, it long ago became conventional wisdom that coherent periodic stimulations are required for any commercially successful ink jet printer.

However, I now believe this prior supposition to be erroneous for many applications where larger cross-machine dimensions are desired. For example, I have adopted the following general line of reasoning:

(1) Standing acoustic waves across the cross-machine dimension can be minimized most simply by totally avoiding the use of coherent stimulations. If no artificial perturbations of any kind are utilized, there cannot (at least theoretically) be any such standing waves. If random artificial perturbations ("RAP") are employed, the standing waves will be minimized (e.g., of only extremely short durations and disposed if at all only at non-stationary locations) or perhaps even eliminated. (My earlier referenced related copending application Ser. No. 428,490 claims certain RAP jet printing features.)

(2) Natural random drop formation processes (i.e., non-artificially perturbed ("NAP")) inherently *avoid* the formation of satellite drops—virtually irrespective of the viscosity, surface tension, etc., of any particular liquid being used.

(3) Although random drop formation necessarily means that drop sizes and spacings will randomly vary, these random variables have been observed to have fairly narrow statistical distribution curves respectively centered about the expected natural drop formation size and spacing. Furthermore, I have noted that the statistical distribution curves for these drop variables can be effectively controlled (i.e., the absolute value of the mean deviation from a given norm can be reduced) by one or more of the following controls: (a) increase in fluid pressure, (b) decrease in orifice size. In addition, it may be desirable to provide a somewhat longer drop charging zone, and a somewhat higher charging and/or deflection voltage.

(4) Although a non-artificially perturbed (NAP) liquid jet printer can be expected to have degraded ability for effecting controlled drop placement onto a desired substrate location (as compared to the same printing system when it is coherently stimulated as is conventionally done), this expected degradation can be controlled as suggested just above to fall within predetermined acceptable limits (for at least some applications and especially for textile uses where greater expected wicking or other phenomena cause greater spreading of deposited droplets anyway). For example, if a given droplet misregistration value of E is deemed acceptable for a given application, a conventional coherently perturbed liquid printer can be conventionally designed to meet this requirement. It will have some predetermined fluid pressure P, some orifice size D, some charging zone length L and some charging voltage V. However, I am proposing that a similar NAP liquid printer can be designed to provide substantially the *same* droplet misregistration value E *provided* that the P, D, L and V parameters are properly controlled.

(5) Without artificial perturbations being employed, there is virtually no limitation on the length of the orifice plate or the cross-machine width over which a continuous array of orifices can be employed for use across the width of a wide or narrow substrate or receiving medium. Thus, textiles, paper or other substrates having widths varying from a few feet to several yards can be treated as they are moved or otherwise indexed beneath a single machine-wide orifice structure. A plurality of such machine-wide orifice arrays can, of course, also be operated in tandem or in some predetermined manner or sequence to accomplish any desired result (e.g., the successive printing of differently colored dyes, et.).

In spite of conventional wisdom to the contrary, the above-explained line of reasoning has led me to previously propose (in my earlier related parent patent applications) NAP liquid jet printing as a practical solution to the need for servicing extensive cross-machine widths—especially for the textile industry. However, I have also discovered that a NAP system can be extremely sensitive to ambient acoustic vibrations (e.g., factory noise, human whistles, outside traffic noise, etc.). This, among possibly other factors, has led to my further proposal to purposefully introduce a controlled amount of random noise into the system so as to provide a random artificially perturbed (RAP) liquid jet printer (as claimed in my above-referenced related copending application Ser. No. 428,490).

Although, as presently perceived, RAP may be preferable to NAP for patterned printing onto textile surfaces, I continue to believe that NAP techniques should be capable of achieving practical levels of droplet misregistration error E even in the context of some pattern printing applications—provided that the P, D, L and V parameters of the system are properly controlled. Furthermore, there are other useful textile industry uses (e.g., as a solid shade dye applicator) for the NAP type of liquid jet printer having droplet misregistration errors less than about 0.1 inch as has now been actually demonstrated by my recent experiments. Here, even though no patterns are being printed, it is still necessary to keep misregistration errors small enough to ensure a uniform final dyed shade.

Most current textile solid shade dyeing techniques involve considerable initial excess wet pickup of dye by the textile. Such initial excess wet pickup is disadvantageous for several reasons. First, it may even adversely affect the resulting dyed textile quality. Second, it most certainly requires considerable extra expense and effort just to evaporate or otherwise remove the excess liquid. Furthermore, the maximum permitted rate of evaporation causes longer required time for the evaporation of excess fluid thereby slowing the rate of processing or requiring more extensive evaporation ovens or other capital expenditures. Either alternative increases the cost of processing fabric. Thus the fact that NAP is capable of minimizing such excess wet pickup can in itself be of tremendous economic advantage.

Although droplet break-up in an unperturbed, continuous jet system (i.e., NAP) is a random process, the distribution of random droplet sizes and spacings is nevertheless quite narrow. At smaller orifice sizes and higher fluid pressures, the variations among randomly generated droplets can be made sufficiently narrow so that the resulting random droplet streams become useful, for example, in applying solid shade colors (dyes) to textile substrates and possibly for applying color patterns or any other type of treating agent or agents to textiles or for applying patterned indicia or treatments to a variety of other surfaces employing a variety of liquids.

To achieve a given accuracy of droplet placement, or "droplet misregistration value," an unperturbed system with the same flow rate (as will often be required to provide the requisite capacity of fluid delivery to the substrate) requires a different orifice size and pressure than a perturbed system. The orifice size must be smaller than would be used to achieve the same accuracy in a conventional perturbed system, typically no more than about 70% of the orifice diameter of a perturbed system having the same accuracy of droplet placement or droplet misregistration value. The liquid head pressure is also substantially higher (e.g., to maintain the desired liquid flow rate), preferably at least about four times that of a perturbed system with corresponding accuracy. Further, it is desirable that the charging voltage be higher, by a factor of at least about 1.5 times. (Alternatively, the deflection voltage might be increased to compensate for greater expected variation in the e/m ratio of NAP droplets.)

For purposes of this specification and claims, the term "droplet misregistration value" E (in inches, centimeters or any other desired unit of distance measurement) is defined as the maximum perpendicular offset distance or variation from an imaginary intended straight line of pixel markings (assumed to be drawn on the substrate under the orifice array in the "cross-machine" direction perpendicular to the direction of substrate travel and through the mean of actual dot placements) of any elemental dot mark placed on the substrate when all jets in the orifice array are simultaneously switched from being caught by the gutter to being delivered to the substrate for one pixel width. This definition as pictorially illustrated at FIG. 1D is now explained in greater detail just below.

When an ink jet printer is in operation, depending upon the wet pickup desired, there is a so-called "print window" $T_P$ as depicted in FIGS. 1B and 1C. This print window $T_P$ can, on the average, emit two, three, four, or even more drops depending upon the amount of fluid desired on the fabric. Each line of pixel elements parallel to the direction of the fabric travel may be treated as a separate entity and, in the exemplary embodiment, all such pixels have the same dimensions PW×PL. For example, pixel length PL in the direction of travel is predetermined such that the relation between the tachometer wheel rotations and the timing of the start of a print cycle is selected (via the conventional charging cycle control circuits) such that the machine will deliver a packet of droplets every predetermined increment of substrate travel irrespective of the speed of cloth travel. The orifices may also be spaced apart by the same or different predetermined distance to determine pixel width PW in the cross-machine direction. The pixels on the cloth thus might nominally be squares fourteen thousandths of an inch on a side or perhaps seven thousandths of an inch in the present exemplary embodiments.

Some materials, of course, have greater thickness than others (or other differing characteristics), and as a result it may be desirable to vary the amount of wet pickup on the machine from, for example, approximately two ounces per square yard, to perhaps as high as twelve ounces per square yard. This variation is accomplished by means of emitting greater or lesser numbers of droplets over each pixel element. The amount of time $T_P$ allowed to print such drops within each pixel element space is called the "print window". Pixel element spacings are PW by PL inches and each pixel across the machine typically receives a certain number of drops for each printed pixel element or "spot" (irrespective of the machine's speed) on PL-spaced centers in the direction of machine travel. Wet pickup is controlled by the duty cycle or time $T_P$ that is left open for the print window. Whether a string of droplets is emitted or not (i.e., whether a given pixel is printed) is under conventional control of the machine electronics so as to be able to create patterns, shades or the like. However, if a pixel is to be printed in the exemplary embodiment, it will receive a full complement of intended droplets for the weight of fabric being printed.

Suppose that one were, at one time, to emit a packet of droplets at each orifice location for exactly one pixel time interval (i.e., a packet-sized string of droplets will be left uncharged at each control electrode across the entire machine width). Some of the droplet packets will be released early (that is, those droplets that are breaking off closest to the machine face), while some droplets will be emitted later. The time of emission for the droplet stream is quite short compared to the dwell time over a pixel element, except for the highest rate of substrate transport. The packets will then produce a slightly elongated mark upon the fabric (see depiction at FIG. 1B). Those that have been emitted early will deposit on the fabric first, and those that are emitted late will be deposited at a different location from those emitted early. This string of droplets then will be of a jagged appearance, and one could, for example, use a mean square fit to define the best fit straight line through all of the droplets (see depiction of such an imaginary line in FIG. 1D). In this case, the maximum droplet variation from this imaginary straight line, as determined by measurement, would determine the droplet spread from the average or mean intended line position. The maximum deviation could be defined as the longitudinal dimension between the droplets located at the most extreme outer positions on opposite sides of the intended line.

The perturbations that cause droplet break-off in NAP jets may, at least in part, arise from the environment in which the system is found. For example, such perturbations may be produced by the normal sound and acoustic motion that are inherently present in the fluid. However, in some "noisy" environments, unwanted external perturbations, for example, factory whistles, vibrations from gears and other machine movements, and even sound vibrations from human voices, can have an overpowering influence and cause a change in the mean break-off point of the jets in an unstimulated system. In a modified embodiment of this invention, the system can be irregularly stimulated, as by a noise source which generates random vibrations. I believe this embodiment can be found useful where the apparatus is to be used in a noisy area and/or where greater printing accuracy is demanded—such as in patterned printing as opposed to solid shade applications of dye or the like. In such an environment, the application of the irregular noise vibration may, in the context of long cross-machine dimensions, surprisingly produce more regular results from jet to jet than application of coherent (i.e., single frequency) cyclical vibrations.

Other objects, features, and advantages of the present invention will become more apparent from the following detailed description of the presently preferred exemplary embodiment and the accompanying drawings, wherein like reference numerals designate corresponding parts in the various figures.

Figure 1:
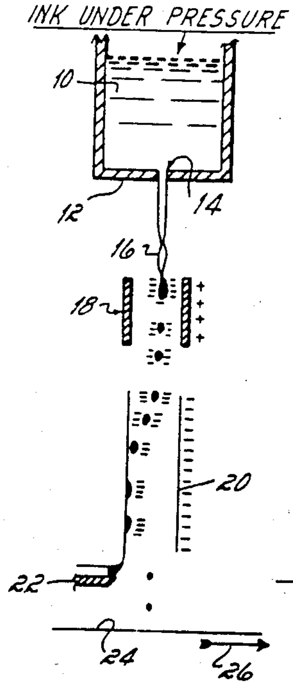
FIG. 1A is a schematic and diagrammatic depiction of optimum and non-optimum drop formation processes using conventional coherent perturbations.
FIG. 1B is a greatly expanded and schematic depiction of an exemplary pixel element boundary definition where controlled packets of droplets are placed selectively into desired pixel element locations on a moving substrate.
FIG. 1C is a graph of the droplet charging voltage versus time for a given control electrode during a typical droplet charging cycle including a pixel "print window" when a packet of uncharged droplets is passed through to print onto a substrate.
Figure 2:
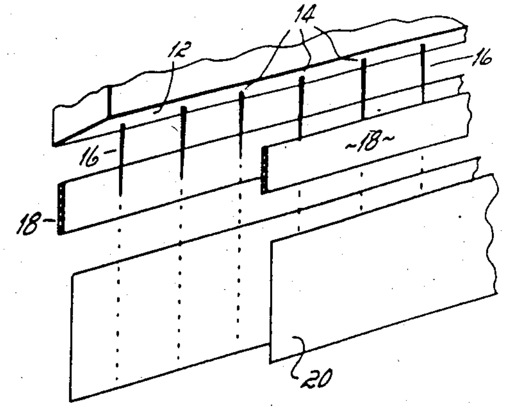
Figure 3:
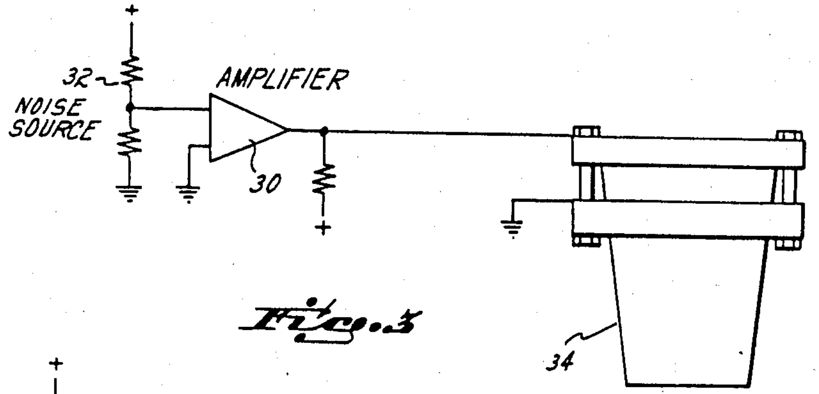
Figure 4:
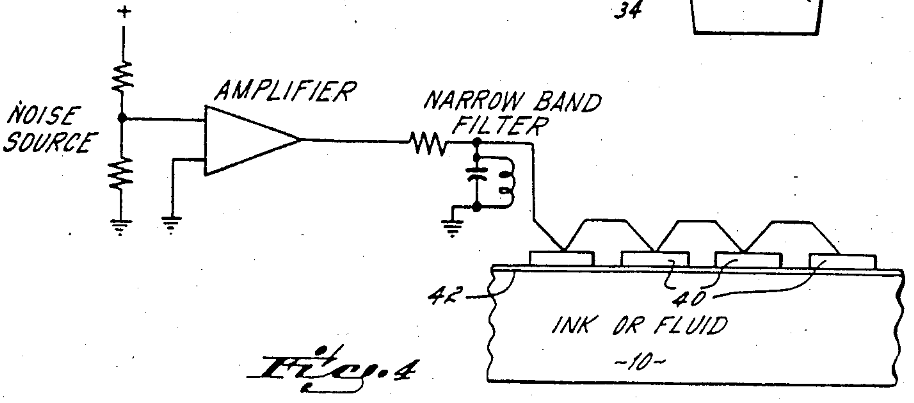
Figure 1A:
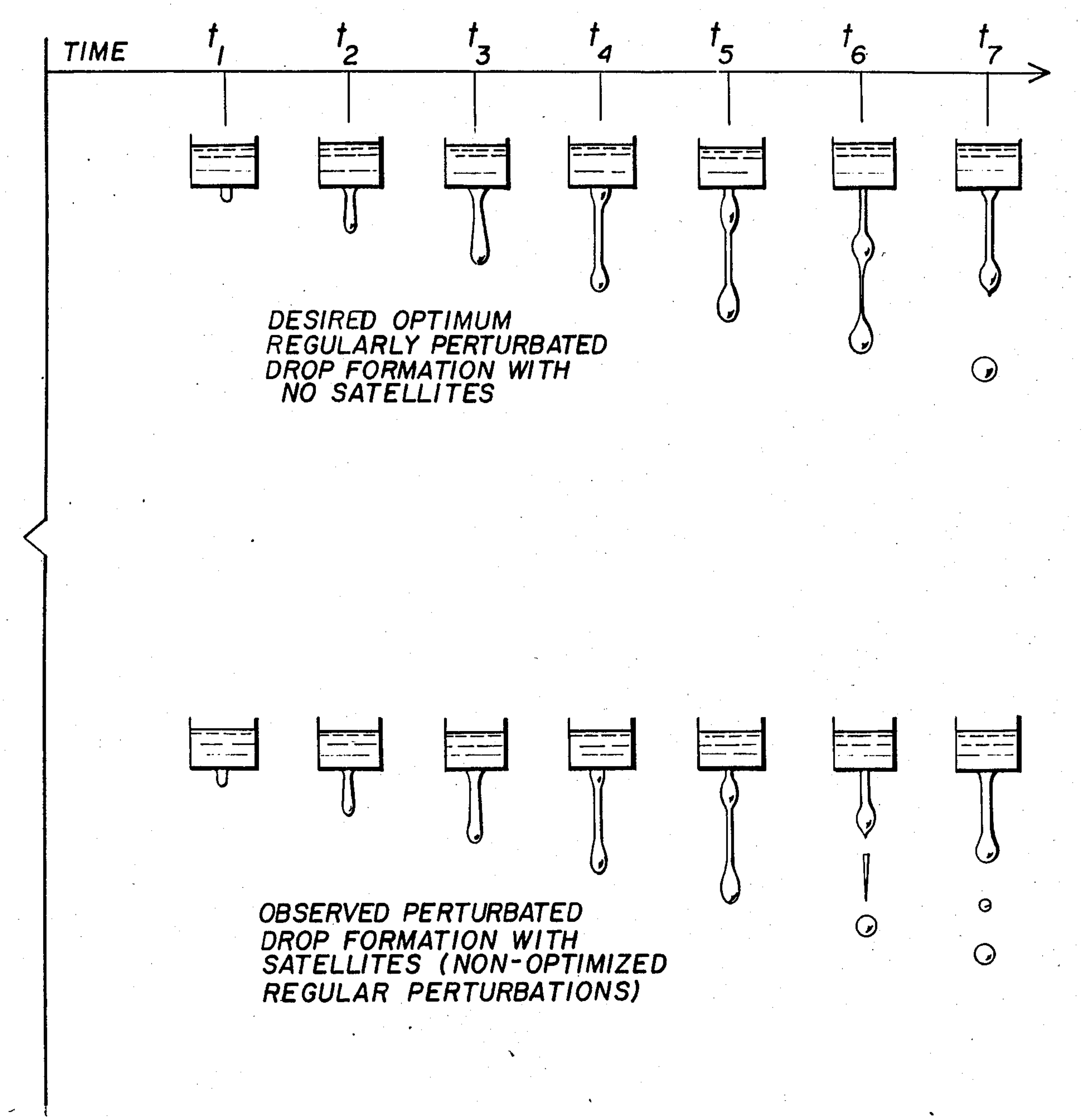
Figure 1B:
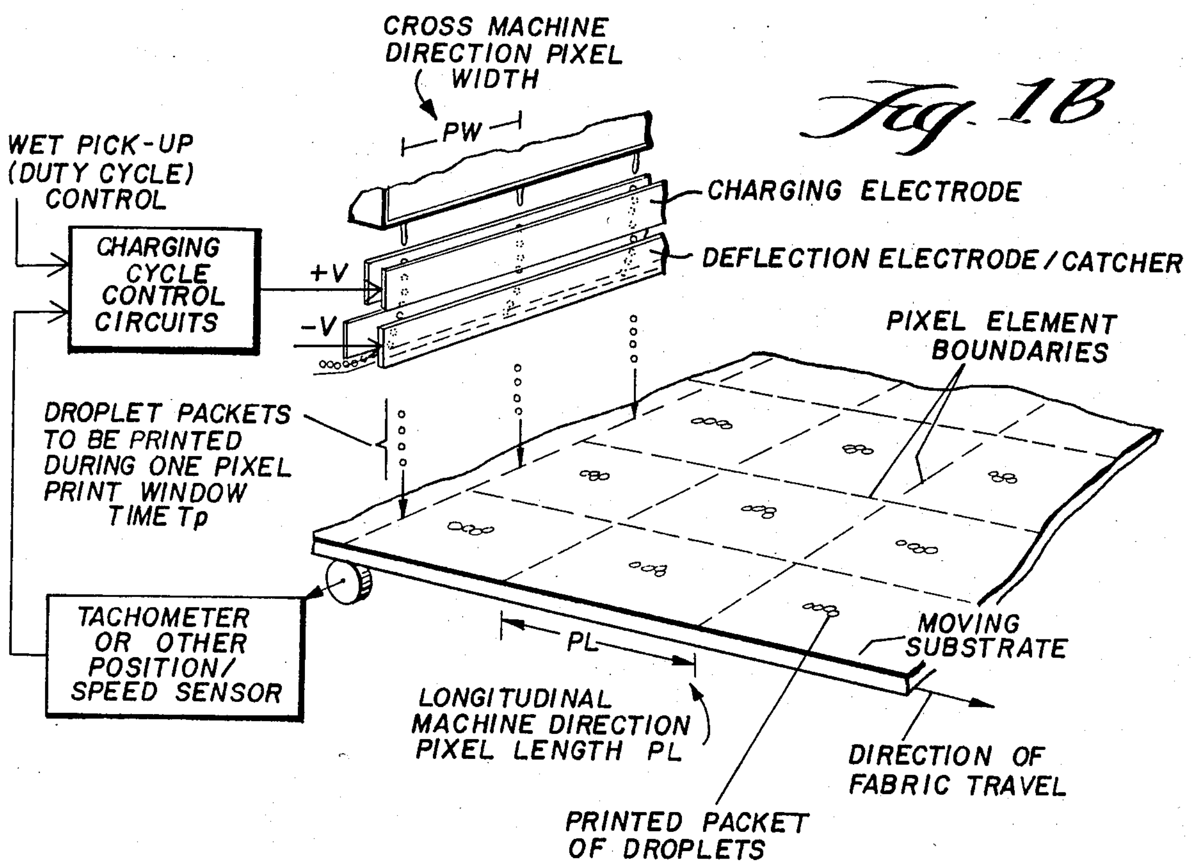
Figure 1C:
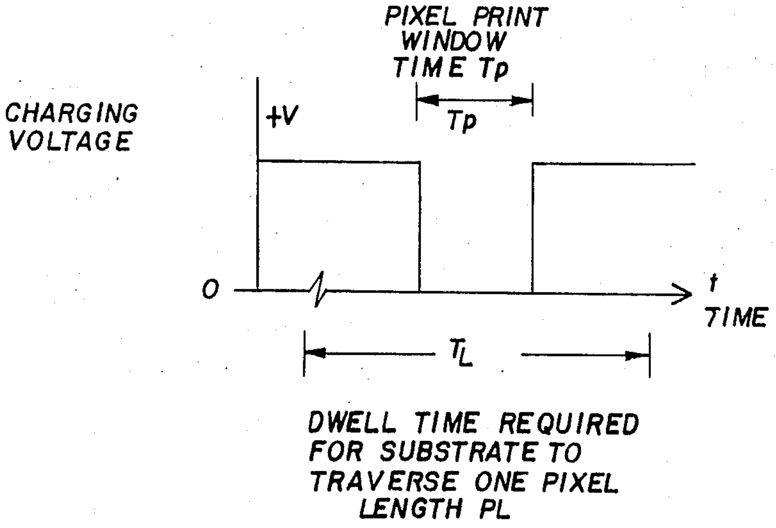
Figure 1D:
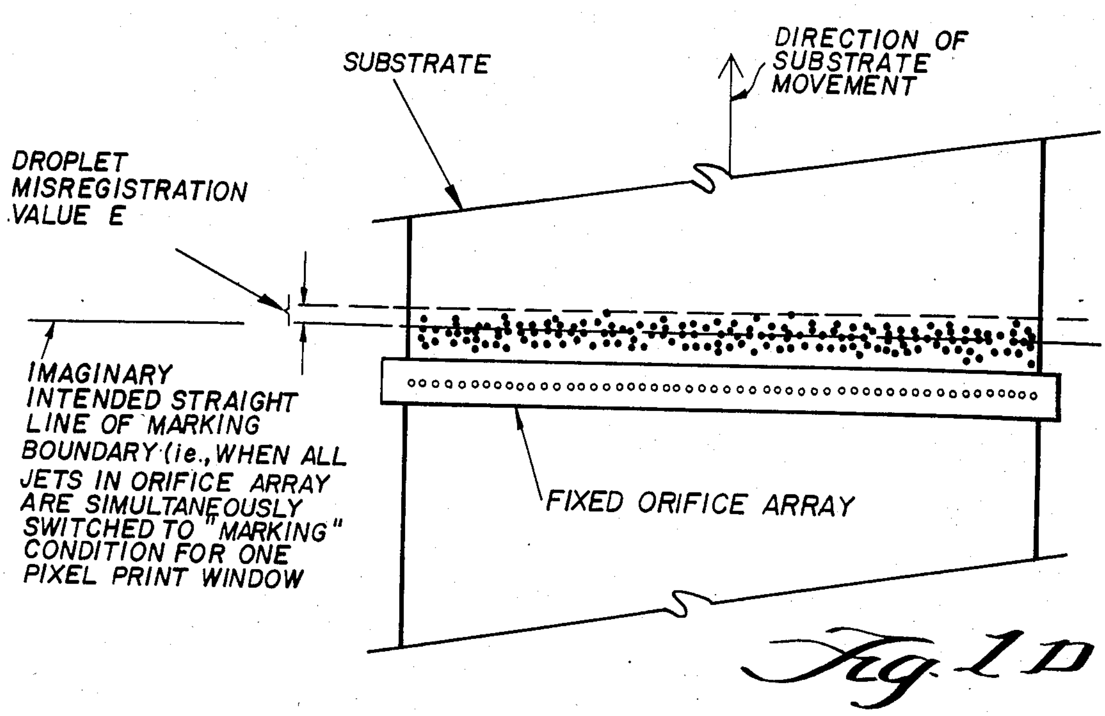
Figure 7:
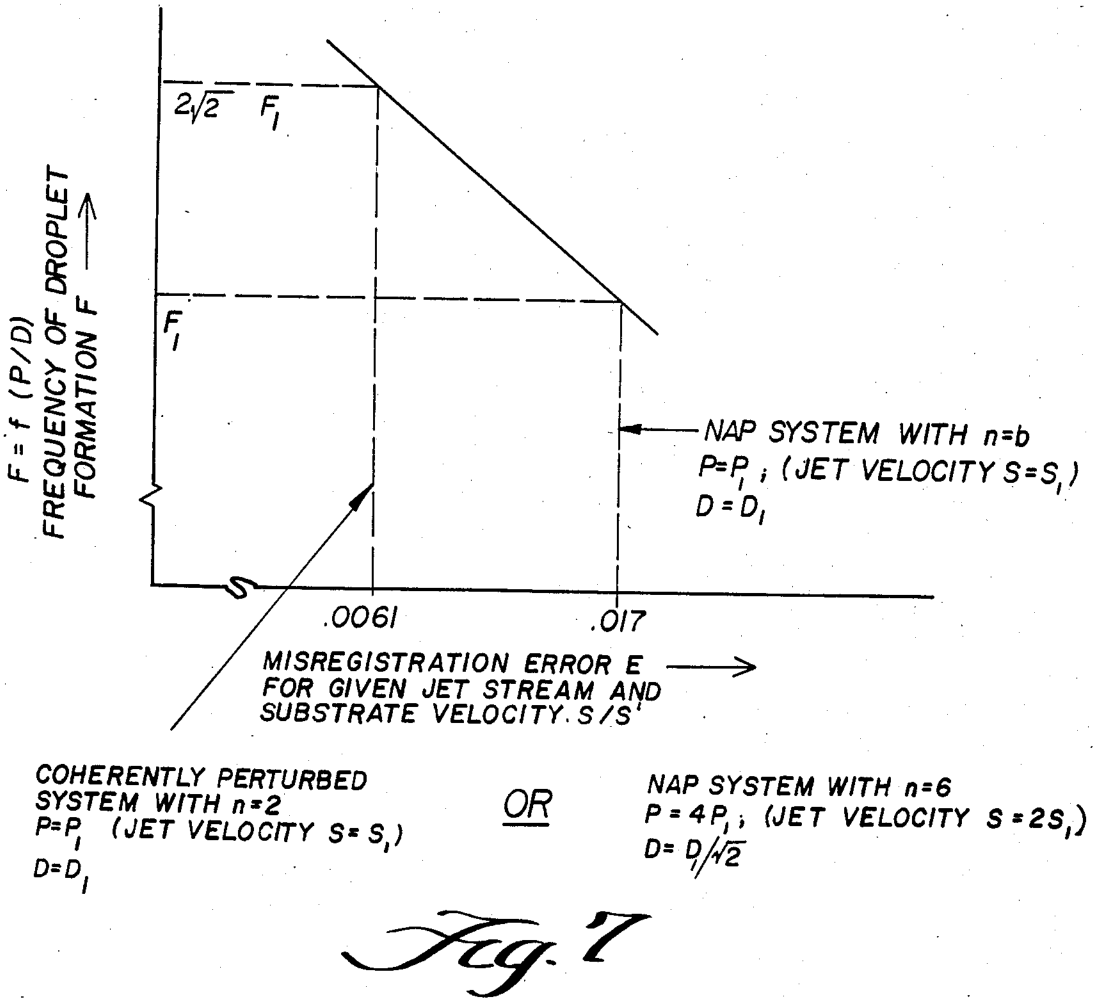
Figure 5:
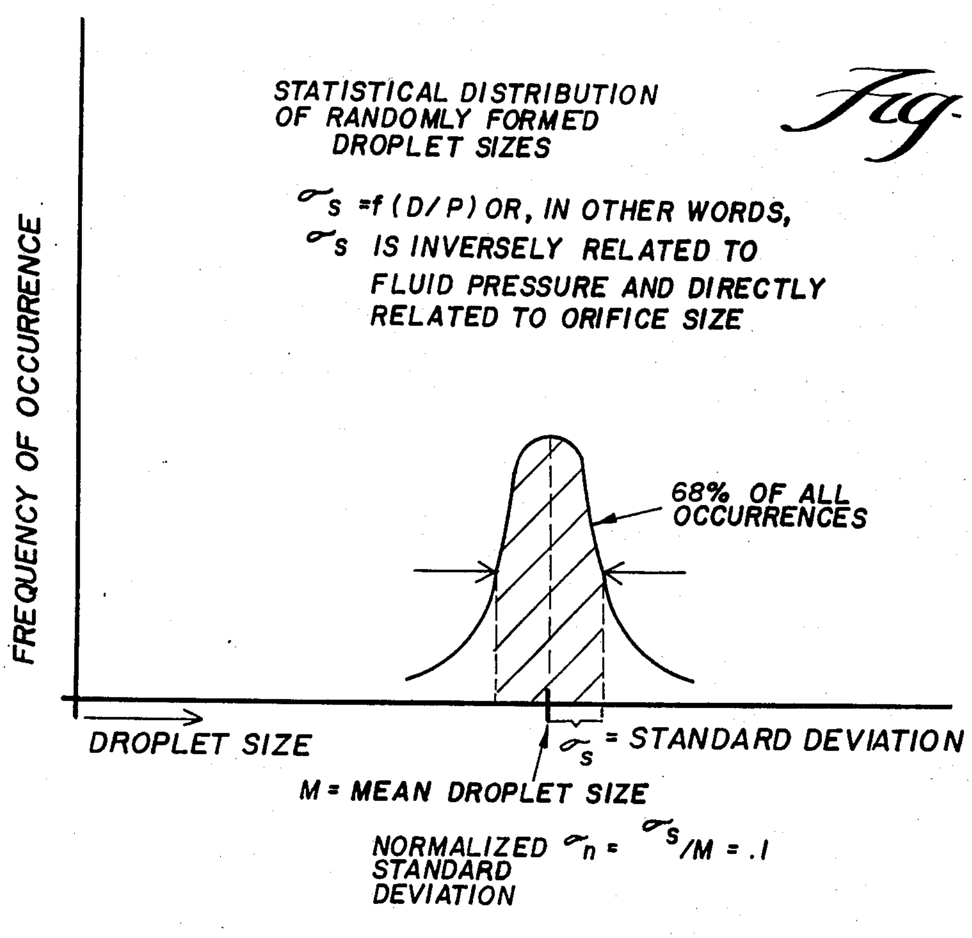
Figure 6:
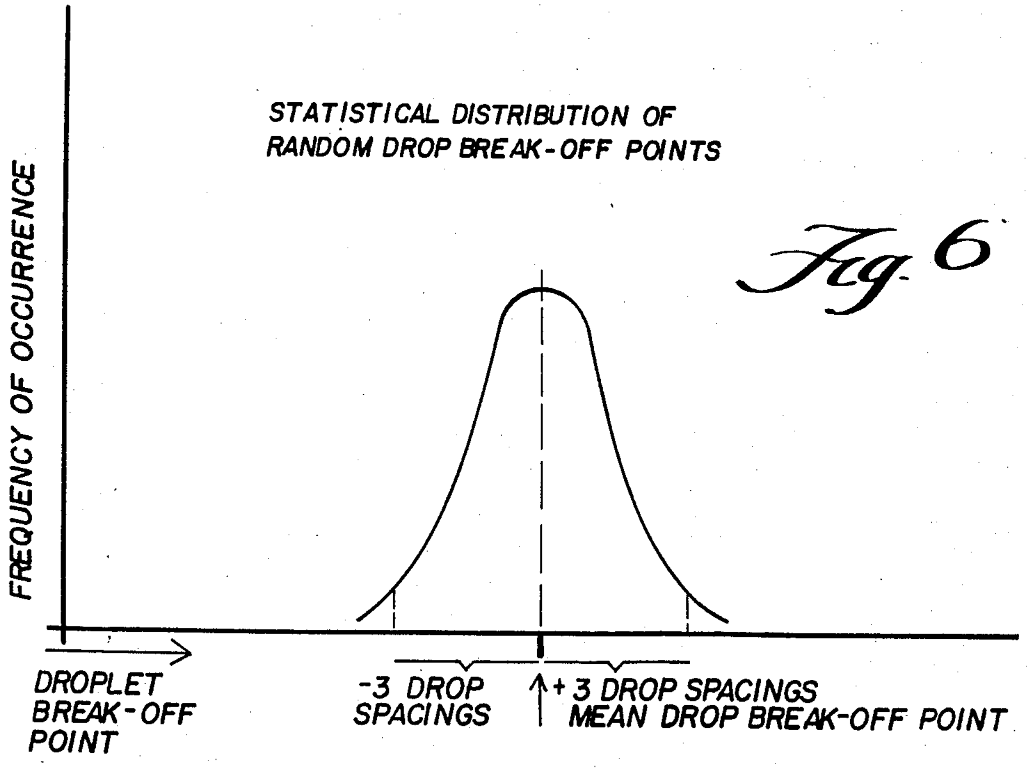

FIG. 1D;is a greatly expanded schematic and diagrammatic depiction of the herein adopted definition of "droplet misregistration value" E;

FIG. 2A is a diagrammatic cross-sectional illustration of an exemplary binary-controlled NAP continuous liquid jet apparatus suitable for use as a uniform shade dye applicator;

FIG. 2B is a diagrammatic perspective illustration showing the droplet charging means and the droplet deflecting means for the FIG. 2A embodiment;

FIG. 3 is a schematic illustration of a RAP modified embodiment, wherein the apparatus is stimulated by a random noise generator that drives an acoustic horn;

FIG. 4 is a diagrammatic illustration of another embodiment of a RAP random noise perturbed system, wherein a series of piezoelectric crystals apply random noise perturbations to a wall of the fluid or liquid supply manifold or chamber;

FIG. 5 schematically illustrates the expected statistical distribution of randomly formed droplet sizes;

FIG. 6 schematically illustrates the expected statistical distribution of random droplet break-off points; and FIG. 7 graphically illustrates a design technique for achieving a desired misregistration error using a NAP system which is, in this regard, substantially equivalent to a conventional coherently perturbed system.

While this invention may be similar to previously known ink jet recording apparatus in that similar results can be achieved, the basic operating principle of the present invention differs radically from known commercially successful coherently perturbed ink jet recording systems.

As shown diagrammatically in FIGS. 2A and 2B, the apparatus includes a supply or source of treating liquid 10 under pressure P in a manifold or chamber that supplies an orifice plate 12 having a plurality of jet orifices 14 each of diameter D, such orifice array extending in a "cross-machine" direction of the apparatus as shown in FIG. 3. Streams or jets of liquid 16 forced through the orifices 14 pass through electrostatic droplet charging means 18, 18 (operating at a voltage V), which selectively imparts to the liquid electrical charges that are then retained on the isolated droplets as the streams break into discrete droplets. As shown in FIGS. 2A and 2B, a continuous or "ribbon-like" electrode is illustrated such as might be used in a solid shade (or horizontal stripe) applicator or the like where all the jet streams are controlled together in tandem. For pattern printing where selective control of droplet placement along the cross-machine dimension is needed, separately controlled individual charging electrodes would be employed. See, for example, my related copending application Ser. No. 501,785.

The charging plates 18, 18 must be sufficiently extensive in the depth dimension L (i.e., in the direction of jet flow) to charge droplets regardless of the random points at which droplet break-off may occur. In prior art apparatus, coherent perturbations have been used, in part, to cause breakoff to occur only in a narrow zone (thus permitting use of narrow depth charging electrodes), downstream of the orifices. Here, without any perturbations, the point of break-off along the jet streams varies more widely. In order to assure that all droplets in each stream are charged, the charging plates 18, 18 must provide a sufficiently wide charging field which extends to the region of breakoff of all such droplets. In practice, the charging plates should preferably have a depth dimension L of about 50D inches (50 D cm) in the direction of jet flow where D is the orifice diameter in inches (or centimeters). The charging electrode depth L in the direction of droplet flow could range from about 20D to about 300D. Charging voltage V to charge plates 18,18 preferably ranges from about 50 to about 300 volts. As will be understood, a single charging electrode 18 (instead of one on each side of the jet streams) may be utilized although this increases the risk that any satellite drops that are present may fly towards and onto such a single charging electrode as will be appreciated.

After charging, the droplets then fall past a deflecting electrode 20 which directs the paths of any charged droplets toward a suitable gutter or collector 22. Uncharged drops proceed toward a receiving substrate 24 (e.g., a textile), which is supported by and may be conveyed in some predetermined manner by means not shown, relative to the apparatus, in the direction of arrow 26 (i.e., a longitudinal direction transverse to the "cross-machine" direction previously defined). The deflector electrode 20 is preferably operated at voltages ranging from about 1000 to about 3000 volts.

The cross-machine dimensions may be virtually unlimited. In particular, the cross-machine dimension may be in excess of 10.5 inches because no artificial regular perturbations are employed. In the preferred exemplary embodiment, for an orifice diameter D, and jet-to-jet spacing of about 4D, the total number of jets is greater than 1500.

Reference may be had to known ink jet devices for further details of structural elements suitable for use in such apparatus.

In part, the structure of the present invention differs from the prior art in that the streams break up into droplets in response to a variety of factors including internal factors such as surface tension, internal acoustic motion, and thermal motion, rather than coherent regularized external perturbation. No coherent varicosity inducing means are utilized, in contrast to what has heretofore been believed essential for practical and commercially acceptable results. Rather, droplet formation takes place randomly.

Lord Rayleigh explored the dynamics of fluid jets around the beginning of the 20th century. He found that a fluid stream issuing under pressure from a jet orifice breaks into individual droplets at droplet-to-droplet intervals that statistically average 4.51D, where D is the diameter of the orifice producing the jet. The droplet diameters average about 1.9D. However, these spacings and sizes are only averages. Actual break-up is a random process; the actual droplet size and spacings vary. The actual sizes and spacings follow normal distribution curves around the means defined by the Rayleigh formulae. For example, in apparatus having an ink pressure P of 12 psig and an orifice diameter D of 0.002 inch (0.0051 cm) the mean droplet size is about 0.0038 inch (0.0096 cm). The normalized standard deviation of the droplet sizes (that is, the standard deviation of droplet size, divided by the mean droplet size) is about 0.1. Thus, 68% of the droplets are within $3.8\times10^{-4}$ inch ($9.6\times10^{-4}$ cm) of the mean droplet size of 0.0038 inch (0.0096 cm). The statistics of drop size variations are depicted at FIG. 5. Further, the break-off point varies from jet to jet by up to about six or so drop spacings. These variances are two wide for utility in many applications. When intending to print a horizontal line across a substrate (or the beginning of a solid shade horizontal bar, section or the like), all jets are commanded to print at the same time by simultaneously removing voltage from the charge plate at all jet positions. (In the exemplary embodiment of FIGS. 1 and 2, this is automatically the case since only one set of charging electrodes 18, 18 is utilized to commonly serve all the jet streams.) It can be seen that if all jets break up into droplets at the same time and at the same distance from the orifice plate, the system will simultaneously cause all jets to start issuing uncharged drops and these drops will proceed to the paper in step.

For a normalized standard deviation of droplet size of approximately 0.1, as is encountered in practice, this corresponds to about a 32% chance the droplet will be larger or smaller by that amount and the spot size on the substrate will correspondingly vary. This produces variation in the apparent uniformity of a horizontal line. This effect of differing droplet size will be minor, however, in that for a standard deviation of 0.1 with a droplet of 0.004 inch (0.0102 cm) in diameter, the standard deviation from the desired line (due to different printed dot sizes) will only be about 0.001 inch (0.0025 cm).

In flight from the point of break-off, larger drops have more mass than smaller drops, in proportion to the third power of the ratio of their diameters. The fluid dynamic force from passage through air that tends to slow them down is proportional to the square of the ratio of their diameters so that larger drops tend to maintain faster speeds in traveling to the substrate. Assuming, however, that all jets break off at the same time, for an orifice diameter D of 0.003 inch (0.0076 cm), a distance to the substrate of one inch, a jet velocity of 400 inches per second (1000 cm/second), a substrate velocity of 60 inches per second and an assumed deviation of as much as 0.1 or 10% of the drop diameter, the misregistration on the substrate is less than 0.002 inch (0.0051 cm). Thus one can conclude that for both the just-discussed reasons, droplet size variations could be made to produce insignificant misregistration errors even in a NAP system.

However, in the event one jet breaks off closer to the orifice plate than the mean break-off point of all jets by some number n of mean drop spacings (half the total spread) the resulting droplet (which I shall call the "late droplet") will have a farther distance to travel to the substrate than a droplet from the mean breakoff point (which I shall call the "mean droplet"). To date, the total spread of drop spacings I have noticed is about 6 (i.e., about +3 and −3 about the mean as depicted in FIG. 6). Drop break-off points can vary from this, for example, by about ±1 to about ±4.

If S is the jet speed or velocity (a function of fluid pressure and other fluid parameters as will be appreciated) in inches per second (or cm/second), D the orifice diameter in inches (or cm), and S′ the rate of movement of the substrate along the longitudinal machine direction 26 in inches per second (or cm/second) the arrival of the late droplet at the substrate will occur about n (4.51D/S) seconds after the arrival of the mean droplet. During this time interval the moving substrate will have traveled a distance of n (4.51D) S′/S inches (or cm). By way of example, at a substrate speed of 60 inches per second (152.4 cm/second) corresponding to a substrate moving at 100 yards per minute, a jet velocity of 800 inches per second (2032 cm/second), an orifice diameter of 0.003 inch (0.0076 cm), and with n=6, the misregistration error is 0.0061 inch (0.0155 cm). It is to be noted that if D were $\sqrt{2}$ times larger and S twice smaller, the error would be 2 $\sqrt{2}$ larger, or about 0.017 inch (0.0432 cm). Thus, the use of the smaller diameter orifice and the higher pressure fluid in an unstimulated NAP system can achieve smaller misregistration errors than a similar but coherently perturbed system of conventional orifice diameter and pressure.

In devices heretofore available, regular periodic (i.e., coherent) stimulation or perturbation means have been required to narrow the distribution in drop size to essentially zero, to achieve acceptable misregistration errors. However, I have found that errors due to the distribution of drop sizes can be substantially controlled and reduced by certain conditions. This can be seen from the following analysis (and as summarized in FIG. 5). The normalized standard deviation of droplet size remains constant at 0.1 as the diameter D of the orifice is made smaller and also as the pressure P is increased, in the absence of coherent perturbing means. If the orifice diameter D is reduced by, say, K (e.g., a factor of the square root of two ($\sqrt{2}$), the area of the orifice is accordingly decreased by $K^2$ (e.g., a factor of two). If, however, at the same time stream velocity S is increased by a factor of $K^2$ (e.g., two), the net flow from the orifice remains constant.

For similar charge and deflection fields the drop trajectories will remain constant, but the natural frequency now is $K^3$ (e.g., $2\sqrt{2}$) higher and therefore now $K^3$ (e.g., $2\sqrt{2}$) as many drops formed per unit time, and the time of flight to the substrate for any given drop is reduced by $1/K^2$ (e.g., halved). If the breakup point with a full sized jet varied over six drop spaces due to the random nature of break-up, as is often the case, a print error would occur of six times the break-off time interval times the speed of the substrate. With the smaller orifice and higher pressure jet, the same error in break-off distance would result in an error only $1/K^3$ (e.g., $1/2\sqrt{2}$) as great (e.g., that is, equivalent to n=2.12 in this example instead of six or only 35% of the error otherwise expected above). That is, an unperturbed system with actual drop formation points that vary by about six drop spaces may nevertheless be made to have about the same droplet misregistration error E as a coherent periodically stimulated system having drop formation points that vary by only about two drop spaces if the orifice diameters and stream velocity are decreased and increased respectively by factors K and $K^2$. This design process is illustrated at FIG. 7. Furthermore, fluctuations in density would now be averaged over $K^3$ (e.g., $2\sqrt{2}$) drops; (e.g., if there is a 32% chance that the drop radius for the larger orifice case varied 10%, with a corresponding volume variation of 33%, there would only be a 9% chance the smaller orifice system would so vary).

The design technique depicted in FIG. 7 may perhaps be more fully appreciated by a three-stage discussion of (1) a conventional coherently stimulated or perturbed system having a given droplet misregistratration error; (2) the same system but with the stimulator turned off and the expected droplet misregistration error associated with this modified system; and (3) the further modified exemplary embodiment of this invention where the stimulator remains turned off but where the orifice size is decreased and the fluid pressure is increased so as to maintain the same overall fluid flow rate while simultaneously reducing the droplet misregistration error of such an unstimulated system so as, for example, to be equivalent to that of the first or conventional stimulated system:

(1) Conventional Coherently Stimulated System

D=Orifice Area
$A=\pi D^2/4$—Orifice Area
$\rho$=Fluid density $$v = \sqrt{2Pg/\rho} \text{ = fluid jet velocity through orifice}$$

S=4.51D=assumed interdrop spacing
F=v/4.51D)=natural frequency of drop formation and assumed frequency of coherent periodic stimulation $$Q = Av = (\pi D^2/4)\left(\sqrt{2Pg/\rho}\right) \text{ = Fluid Flow Rate}$$

n=about 2=number of drop spacings between highest and lowest drop formation points along a linear cross-machine array of many orifices as observed
g=the acceleration of gravity.

It is the *difference in time* (between the time required for a droplet formed at the highest point to reach the substrate as compared to the time required for a droplet formed at the lowest point to reach the substrate) which is most responsible for the droplet misregistration value E—because the substrate being printed continues to move during this time difference interval. Thus for n=2, the given interdrop spacing 4.51D and jet velocity v (together with substrate velocity which will here be assumed constant) give rise to some predetermined droplet misregistration value E=X.

(2) System (1) But Without Stimulation

Since stimulation in system (1) was assumed to be at the natural drop formation frequency, the mean or average value of the interdroplet spacings and frequency of formation in this example (2) will remain unchanged. However, because of the now random drop formation process, n will increase to about 6 (see above). Therefore, it necessarily follows that the droplet misregistration value E can be expected to increase to a second higher predetermined value (6/2)X=3X.

(3) System (2) With Same Fluid Flow But With Orifice Diameter Decreased and Fluid Pressure Increased Q'=A'v'=Q=Av (assumed same fluid flow rate
D'=D/K (reduced orifice diameter) where K=constant greater than one
$A'=\pi(D')^2/4=\pi D^2/(4K^2)$
Therefore $$v' = Av/A' = K^2 v = K^2\sqrt{2P/\rho}$$

S=4.51D'=4.51D/K $$F = v'/4.51D' = (K^2 v)/(4.51D/K)$$
$$= K^3 v/(4.51D)$$
$$= K^3 F \text{ (i.e., incresed)}$$

n'=6 (as observed).

Thus the critical *time difference* between the printing of the highest and lowest formed drops in the array (which time difference is ultimately most responsible for droplet misregistration) is here reduced by two factors:

(a) the individual drops are closer together (by a factor K) thus reducing the distance associated with the n=6 droplet spacing between the highest and lowest formed drops; and (b) the drops are moving faster (by a factor $K^2$) thus requiring less time to pass through a given distance between the highest and lowest formed drops.

The result is that by reducing the orifice diameter D by the factor K while increasing the fluid jet velocity v by the factor $K^2$, an overall improvement of $K^3$ in droplet misregistration erro can be realized with respect to system (2). Thus if $K=\sqrt{2}$, then $K^3$=about 2.82 and the error E'=3X/2.82=1.06X—*or in other words, almost the same as for the conventionally perturbed system* (1)! By merely choosing K slightly larger than $\sqrt{2}$, E' can be made equal to E as should now be appreciated.

Though a coherent regularly periodically stimulated system can in principle be designed to deliver with high accuracy, in practice errors occur of up to two drop spacings. With an unstimulated NAP system, the break-off point can vary over six to seven drop spacings or so, but, as just demonstrated, by reducing orifice size D and increasing pressure P, this error can be reduced to that of a coherently stimulated system with the larger orifice size, while still offering the advantage of substantially unlimited orifice plate length.

In general, for this purpose, the orifice size may be in the range of 0.00035 to 0.020 inch (0.0008 to 0.05 cm) and the fluid or liquid pressure may be in the range of 2 to 500 psig (0.14 to 35 kg/cm²). The droplet misregistration value can be less than about 0.1 inch (0.254 cm) for applications on substrates having a relatively smooth surface while for application to substrates having relatively unsmooth, rough or fibrous surfaces the droplet misregistration error can be less than about 0.4 inch (1.016 cm), or even 0.9 inch (2.3 cm) where such misregistration could be acceptable, such as where the printing or image will only be viewed from a distance.

More specifically, in one exemplary embodiment, I have found that general applications of a liquid to treat a substrate may utilize an orifice diameter D of about 0.004 inch (0.0102 cm) with the center to center spacing of orifices being about 0.016 inch (0.0406 cm). The liquid head pressures behind the orifices can vary from about 2 to about 30 psig (0.14 to 2.1 kg/cm$^2$). However, the preferred pressure range varies from about 3 to about 7 psig (0.2 to 0.5 kg/cm$^2$). The substrate can move at a velocity (S') of about 0 to about 480 inches per second (1300 cm/sec) with a preferred narrower range varying from about 5 to about 150 inches per second (12 to 380 cm/sec) and the most preferred rate being about 60 inches per second (152.4 cm/sec or 100 yards per minute).

More general ranges for the parameters involved, including the orifice and pressure ranges, are a jet velocity (V) ranging from about 200 to about 3200 inches per second (500 to 8200 cm/sec) with the more preferred velocity range varying from about 200 to about 500 inches per second (500 to 1300 cm/sec) for a general purpose liquid applicator and the most preferred jet velocity being about 400 inches per second (1000 cm/sec). Also, in certain instances substrates could be moved at rates faster than 480 inches per second (1300 cm/sec), such as speeds of 800–1000 inches per second (2000 to 2600 cm/sec), and this apparatus could have applicability to printing at such substrate feed rates.

Finer printing, coloring, and/or imaging of substrates similar to the results obtainable from a coherently perturbed system may possibly be realized using an orifice having a diameter of about 0.0013 inch (0.0033 cm) with appropriate center to center spacing. The pressures will be greater than in the general application circumstances above and will range from about 15 to about 70 psig (1 to 5 kg/cm$^2$), with the preferred pressure being about 30 psig (2 kg/cm$^2$). Here, jet velocities will preferably vary from about 600 to about 1000 inches per second (1500–2500 cm/sec) with the preferred velocity being about 800 inches per second (2000 cm/sec).

Using NAP, the viscosities of the ink, colorant or treating liquid are limited only by the characteristics of the particular treating liquid or coloring medium relative to the orifice dimension. From a practical standpoint, the liquid or medium will generally have a viscosity less than about 100 cps and preferably about 1 to about 25 cps.

Since the present invention can produce applicators of virtually any orifice plate length, as discussed previously, the range of application, unlike the previously discussed coherently perturbed systems, is extremely broad. This is because the jet orifices can not only be constructed in very short lengths, such as a few centimeters or inches, they can also extend for any desired distance for example, 0.1 inch to 15 feet (0.254 to 460 cm) or longer. Accordingly, the present invention is uniquely suitable for use with wide webs or where relatively large surfaces are to be colored or printed with indicia of some type. One example is printing, coloring or otherwise placing images on textiles but it should be clearly understood this is not the only application of this invention. In a similar manner the characteristics of the receiving substrate can vary markedly.

In textile applications virtually all textile dyes and dyestuffs and colorants can be used, being either natural or synthetic, so long as they are compatible with the material from which the orifice plate is constructed (see may related copending application Ser. No. 501,785 for details of one possible orifice plate construction), such as stainless steel or other chemically resistant materials or combinations thereof, and are compatible as well with the orifice dimensions which are desired to be used. (Large particle materials can cause unwanted clogging.) Suitable textile dyes include reactive, vat, disperse, direct, acid, basic, alizarin, azoic, naphthol and sulphur dyes. Included among suitable colorants are inks, tints, vegetable dyes, lakes and mineral colors.

Included among the types of treating liquids are any desired printing, coloring or image forming agents or mediums, including fixatives, dispersants, salts, reductants, oxidants, bleaches, resists, fluorescent brighteners and gums as well as any other known chemical finishing agents such as various resins and reactants and components thereof, in addition to numerous additives and modifying agents. It is believed that all such materials could be effectively employed according to the present invention to produce desired effects on a variety of substrates, as for example, all types of paper and paper like products, cloth and textile webs of various woven, knitted, needled, tufted, felted, batt, spun-bonded and other non-woven types, metal sheet, plastics, glass, gypsum and similar composition board, various laminates including plywood, veneers, chipboard, various fiber and resin composites like Masonite, or any other material as well as on a variety of surfaces including flat, curved, smooth, roughened, or various other forms.

The apparatus shown in FIGS. 2A and 2B is unperturbed. As previously mentioned, background or other vibrations in the area of use can themselves sometimes act as perturbation means and produce undesirable variable results. FIGS. 3 and 4 show a modified embodiment of the apparatus, wherein the system is not regularly or coherently perturbed as in the prior art, but, rather, it is subject to purposeful irregular or noise perturbation, which overrides or masks such background vibration.

In FIG. 3 the noise source includes an amplifier 30 which applies noise from a resistive or other electrical source 32, to a transducer such as an acoustic horn 34. The horn imparts the noise vibrations to the fluid or the manifold. These random perturbations may be applied to the fluid using prior art transducers; but the perturbation they apply herein is irregular, not regular or coherent.

In FIG. 4, the noise transducer is a set of piezoelectric crystals 40 which are mounted to wall 42 of the fluid manifold 12. Other types of transducers may be used, as known in the art. The difference is that they are operated in a narrow band of random frequencies, not at a single coherent frequency.

It is desirable that the central frequency of the noise approximate the natural frequency of droplet breakup. This is about S/4.51 D cycles per second where D is the jet or orifice diameter in inches )or cm) and S the velocity of the jet in inches per second (or cm/sec). The band width is desirably less than about 12,000 cycles/second, so that the random vibrations are most effective in achieving breakoff.

While the invention has been described in connection with what is presently considered to be the preferred representative exemplary embodiments, it is to be understood that the invention is not to be limited to the disclosed embodiments but on the contrary, is intended to cover various modifications and equivalent arrangements included within the spirit and scope of the appended claims, which scope is to encompass all such modifications and equivalent structures.

What is claimed is:

1. A liquid jet device for printing, coloring or otherwise treating a receiving substrate placed thereunder along a cross-machine dimension while the substrate moves along a longitudinal direction transverse to said cross-machine direction, said device having a predetermined droplet misregistration value and comprising:

means for randomly generating droplets from a liquid stream, said random generating means having a predetermined cross-machine width in excess of 10.5 inches and including a source of pressurized liquid at pressure P and orifice means defining a plurality of jet orifices extending in said cross-machine direction, each orifice having a diameter D through which said liquid issues so that droplets are randomly formed having differing sizes and spacings therebetween, said pressure P and orifice dimension D being controlled so that droplet break up occurs substantially within a predetermined distribution around a mean droplet size, charging electrode means disposed downstream of said orifices for a predetermined charging distance to selectively impart charges to droplets as they are randomly formed, collection means for collecting droplets; and deflection means disposed downstream of said charging electrode means and opposite said collection means for deflecting the paths of the selectively charged droplets away from the receiving substrate and toward said collection means, said pressure and diameter values P and D being predetermined to provide said predetermined droplet misregistration value on the substrate surface even though droplet generation occurs randomly.

2. A liquid jet device as in claim 1 wherein said device applies droplets on the substrate at a droplet misregistration value less than about 0.1 inch.

3. A liquid jet device as in claim 1 wherein said droplet misregistration value is defined by the expression n (4.51D)S'/S where n equals the number of mean drop spacings a droplet is formed away from the mean breakoff point, D equals the orifice diameter, S equals jet velocity and S' equals the rate of substrate movement.

4. A liquid jet device as in claim 1 wherein said electrode means has a length parallel to droplet flow which ranges from about 20 to about 300 times the orifice diameter.

5. A liquid jet device as in claim 1 wherein said device is operated at a charging electrode voltage which is at least 1.5 times that of a coherently perturbed apparatus having a source of pressurized liquid at pressure P, and orifice diameter dimension D and having the same droplet misregistration value and fluid flow rate as said device.

6. A liquid jet device as in claim 1 wherein said substrate is a textile.

7. A liquid jet device as in claim 6 wherein said liquid is natural or synthetic textile dyes or colorants or mixtures thereof.

8. A process for imprinting a substrate with a liquid comprising the steps of:

moving a substrate in a longitudinal direction, said substrate having an orifice diameter of D, a jet spacing of about 4D and a total number of jets greater than 1500 arranged in a cross-machine dimension transverse to said longitudinal direction, establishing a liquid flow in the form of an array of jet streams above said substrate at a fixed location and extending in said cross-machine dimension by pressurizing a source of liquid and forcing the liquid through an array of orifices and randomly forming the resulting streams into droplets in a natural and non-artificially perturbed drop formation process, selectively imparting charges to predetermined ones of said randomly formed droplets as they pass downwardly from said orifices, deflecting further downstream the path of the droplets that have been charged and collecting the thus deflected droplets, and controlling the pressure and orifice dimensions so as to achieve a predetermined droplet misregistration value, whereby the uncharged randomly formed droplets are allowed to be selectively deposited on the substrate with said predetermined droplet misregistration value.

9. A process as in claim 8 wherein the orifice size and liquid pressure are established according to a predetermined droplet misregistration value E=n (4.5/D)S'/S where n equals the number of mean drop spacings a droplet is formed away from the mean break off point, D equals the orifice diameter, S equals jet speed or velocity and S' equals the speed or rate of substrate movement.

10. A process as in 8 wherein the substrate is a textile and the liquid is natural or synthetic textile dyes or colorants or mixtures thereof.

11. Textile liquid jet treatment apparatus for selectively applying liquid at predetermined locations along a cross-machine dimension to a receiving textile substrate while it passes therethrough along a longitudinal direction transverse to said cross-machine dimension said apparatus being of the type which includes (a) a source of pressurized treatment liquid having a predetermined pressure P, (b) an array of spaced-apart liquid jet orifices along said cross-machine direction, each orifice having a predetermined diameter D and being in fluid communication with said source, (c) a charging electrode of predetermined length L disposed downstream of the orifices for selectively electrically charging droplets as they break off from continuous jet streams issuing from said orifices by selective application of a charging voltage V thereto, and (d) at least one deflecting electrode disposed downstream of the charging electrode for deflecting electrically charged droplets away from the receiving textile substrate, said textile treatment apparatus being characterized by:

a cross-machine treatment dimension substantially greater than 10.5 inches, and said predetermined parameter values P, D, V and L being interrelated and predetermined so as to produce a predetermined droplet misregistration value on the textile surface even though droplet generation occurs randomly.

12. Textile liquid jet treatment apparatus as in claim 11 wherein said P, V and L parameter values are substantially larger and said D parameter value is substantially less than respectively corresponding parameter values of a coherently perturbed apparatus having the same said predetermined droplet misregistration error in the presence of coherent single frequency perturbations and the same fluid flow rate.

13. Textile liquid jet treatment apparatus as in claim 12 wherein said predetermined orifice diameter D is less than about 70% that of a coherently perturbed printing apparatus having the same said predetermined droplet misregistration value.

14. Textile liquid jet treatment apparatus as in claim 13 wherein said predetermined pressure P is at least two times that of a coherently perturbed printing apparatus having the same said predetermined droplet misregistration value.

15. Textile liquid jet treatment apparatus as in claim 14 wherein said predetermined charging voltage V is at least 1.5 times that of a coherently perturbed printing apparatus having the same said predetermined misregistration value.

16. Textile liquid jet treatment method for selectively applying liquid at predetermined locations along a cross-machine dimension to a receiving textile substrate while it passes therethrough along a longitudinal direction transverse to said cross-machine dimension, said method utilizing (a) a source of pressurized treatment liquid having a predetermined pressure P, (b) an array of spaced-apart liquid jet orifices along said cross-machine direction, each orifice having a predetermined diameter D and being in fluid communication with said source, (c) a charging electrode of predetermined length L disposed downstream of the orifices for selectively electrically charging droplets as they break off from continuous jet streams issuing from said orifices by selective application of a charging voltage V thereto, and (d) at least one deflecting electrode disposed downstream of the charging electrode for deflecting electrically charged droplets away from the receiving textile substrate, said textile treatment method being characterized by:

passing textiles having a cross-machine treatment dimension substantially greater than 10.5 inches along said longitudinal direction, and randomly forming droplets and selectively treating said textile over said cross-machine dimension with said liquid as it passes along said longitudinal direction by only selectively charging some of said randomly formed droplets as they are randomly formed and by permitting the remainder of said randomly formed droplets to fall onto said substrate with a predetermined maximum droplet misregistration value.

17. Textile liquid jet treatment method as in claim 16 wherein said P, V and L parameter values are substantially larger and said D parameter value is substantially less than respectively corresponding parameter values of a choherently perturbed apparatus having the same predetermined droplet misregistration value and the same fluid flow rate in the presence of coherent single frequency perturbations.

18. Textile liquid jet treatment method as in claim 17 wherein said predetermined orifice diameter D is less than about 70% that of coherently perturbed printing apparatus having the same said predetermined droplet misregistration value.

19. Textile liquid jet treatment method as in claim 18 wherein said predetermined pressure P is at least two times that of a coherently perturbed printing apparatus having the same said predetermined droplet misregistration value.

20. Textile liquid jet treatment method as in claim 19 wherein said predetermined charging voltage V is at least 1.5 times that of a coherently perturbed printing apparatus having the same predetermined misregistration value.

* * * * *